United States Patent
Akahori

(10) Patent No.: US 7,620,246 B2
(45) Date of Patent: Nov. 17, 2009

(54) METHOD AND APPARATUS FOR IMAGE PROCESSING

(75) Inventor: Sadato Akahori, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 1057 days.

(21) Appl. No.: 10/628,286

(22) Filed: Jul. 29, 2003

(65) Prior Publication Data

US 2004/0022440 A1 Feb. 5, 2004

(30) Foreign Application Priority Data

Jul. 30, 2002 (JP) ............................. 2002-221300
Jul. 30, 2002 (JP) ............................. 2002-221301

(51) Int. Cl.
G06K 9/46 (2006.01)
(52) U.S. Cl. ..................................... 382/192
(58) Field of Classification Search ....................... None
See application file for complete search history.

(56) References Cited

U.S. PATENT DOCUMENTS

| | | | | |
|---|---|---|---|---|
| 4,208,652 A | * | 6/1980 | Marshall | 382/194 |
| 4,731,859 A | * | 3/1988 | Holter et al. | 382/225 |
| 5,608,543 A | * | 3/1997 | Tamagaki et al. | 358/450 |
| 5,841,902 A | * | 11/1998 | Tu | 382/187 |
| 5,995,668 A | | 11/1999 | Corset et al. | |
| 5,999,647 A | * | 12/1999 | Nakao et al. | 382/187 |
| 6,188,787 B1 | * | 2/2001 | Ohmae et al. | 382/165 |
| 6,418,238 B1 | * | 7/2002 | Shiratani et al. | 382/133 |
| 6,603,877 B1 | * | 8/2003 | Bishop | 382/165 |
| 6,650,776 B2 | * | 11/2003 | Ihara et al. | 382/181 |
| 6,879,417 B1 | * | 4/2005 | Tabata et al. | 358/529 |
| 7,039,232 B2 | * | 5/2006 | Nagarajan et al. | 382/173 |

FOREIGN PATENT DOCUMENTS

| | | |
|---|---|---|
| JP | 5-62879 A | 9/1993 |
| JP | 9-167233 A | 6/1997 |
| JP | 10-512734 A | 12/1998 |
| JP | 11-8768 A | 1/1999 |
| JP | 2001-160057 A | 6/2001 |
| JP | 2002-117409 A | 4/2002 |
| JP | 2002-133412 A | 5/2002 |

\* cited by examiner

Primary Examiner—Matthew C Bella
Assistant Examiner—Alex Liew
(74) Attorney, Agent, or Firm—Sughrue Mion, PLLC

(57) ABSTRACT

The type of an object included in an image is automatically recognized. An image is divided into object regions and into block regions each having a predetermined number of pixels and smaller than any one of the object regions. The types of the respective block regions are recognized and totaled up for each of the object regions. The type of each of the object regions is then recognized by using a result of totaling.

20 Claims, 14 Drawing Sheets

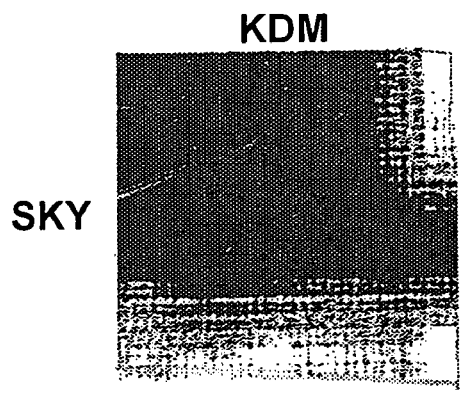
FIG.9A SKY
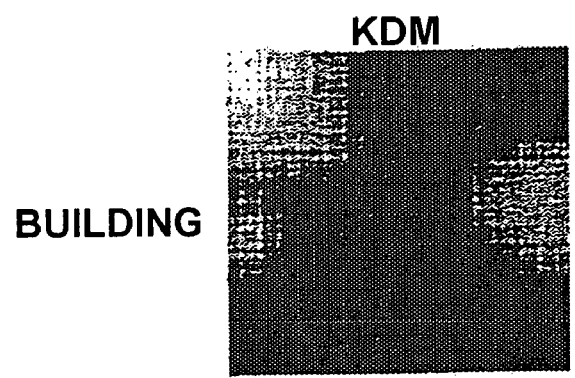
FIG.9B BUILDING
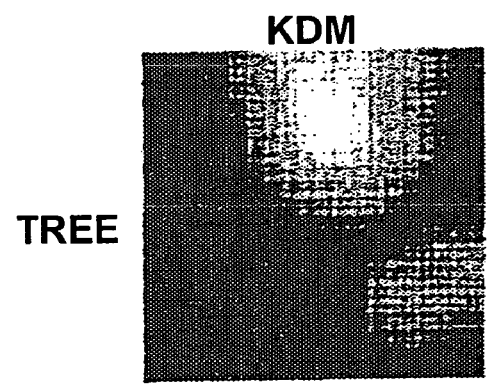
FIG.9C TREE
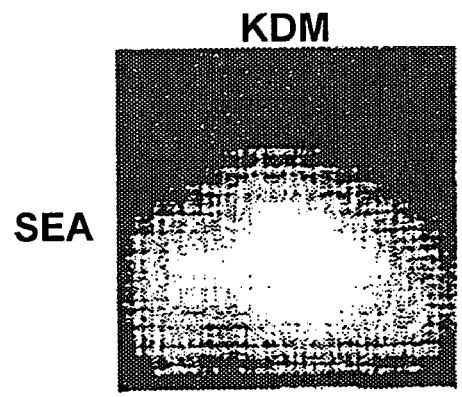
FIG.9D SEA

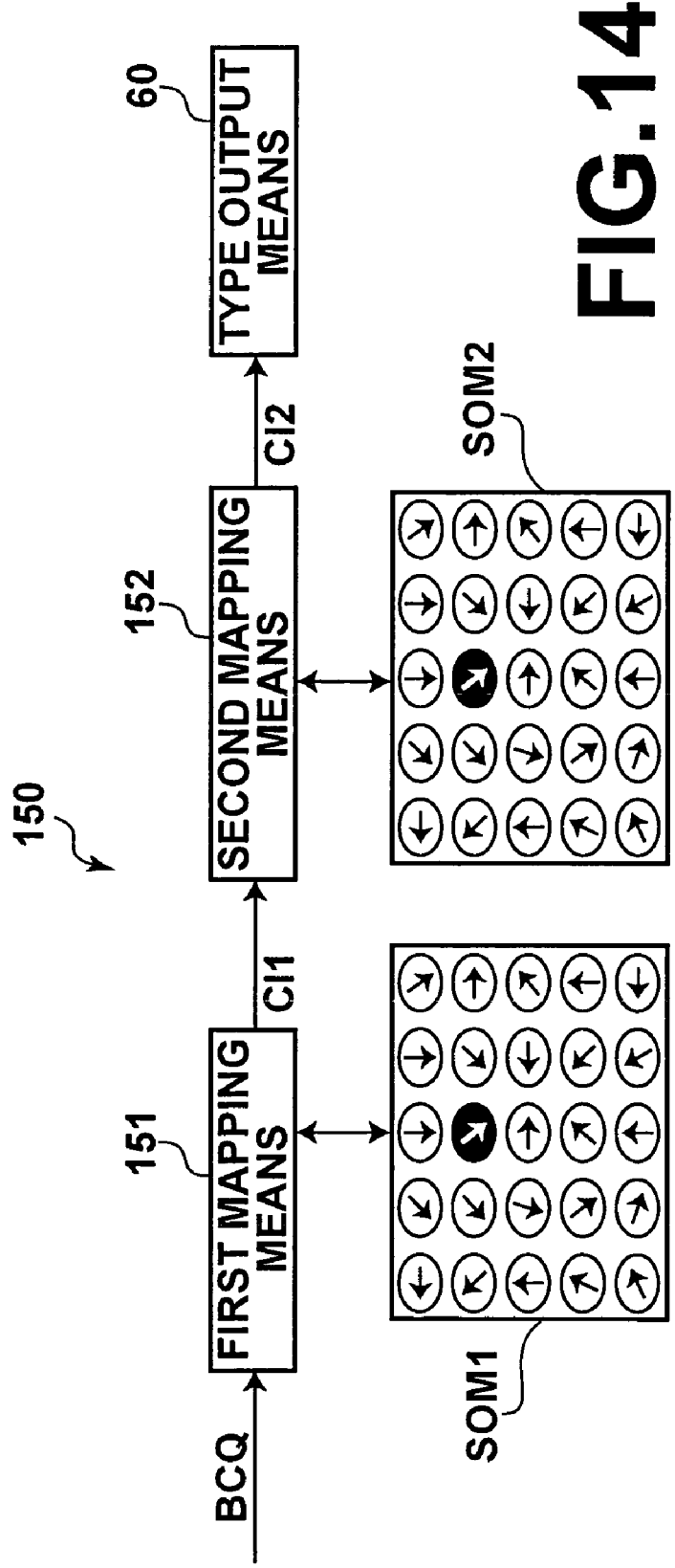

METHOD AND APPARATUS FOR IMAGE PROCESSING

BACKGROUND OF THE INVENTION

1. Field of the Invention

The present invention relates to an image processing method and an image processing apparatus for automatically setting an image processing condition for an object included in an image.

2. Description of the Related Art

If the kind of image which is included in image information obtained by a digital camera or the like can be recognized, image classification, image search, or image processing can be carried out according to the type of an object included in an image.

For example, in the case of image classification or image search, an image search system has been proposed for judging similarity according to a physical characteristic included in an image. More specifically, a method of image classification and search is known wherein an area of an image is extracted and compared with a reference image while being changed in size and position. Furthermore, based on the method described above, a method of efficiently carrying out image classification and image search is also known wherein a color histogram of an area extracted from an image is compared with a color histogram of a reference image so that a position of an object in the image is detected (The Transactions of The Institute of Electronics, Information and Communication Engineers, Vol. J81-DII, No. 9, pp. 2035-2042, 1998, for example). However, in any of the above-described methods, similarity is recognized by the physical characteristic. Therefore, two objects of different types are judged to be similar in some cases, due to similarity in the physical characteristic. Consequently, accuracy of the search is not high.

In the case of image processing, a method of carrying out image processing for high quality is known wherein different image processing is carried out on a specific color area recognized in an image (Japanese Patent Publication No. 5(1993)-62879, for example). This method enables removal of noise by recognizing an area that tends to have a conspicuous noise component, based on a color. However, since the area is recognized from the color alone, skin may be confused with sand. If an area of sand is mistaken as an area of skin and the noise reduction is carried out on the area of sand, the texture of the image may be ruined and the image may thus become unnatural.

In the case where image classification, image search, or image processing is carried out based on information obtained directly from an image, appropriate information cannot be provided to a user. As a method of solving this problem, image classification, image search, or image processing may be carried out after recognizing the type of an object in an image. If the type is recognized in advance, image classification and image search can be carried out according to the type that has been recognized, which leads to easy and accurate image classification and image search. In the case of image processing, image processing can be carried out by using an image processing condition in accordance with the object.

The types of objects included in an image need to be recognized by extracting object regions in the image and by recognizing the types for all the objects. For example, a user may extract an object region in an image and input the type thereof while viewing the image. However, it is a time-consuming operation for the user to extract information on the type.

SUMMARY OF THE INVENTION

The present invention has been conceived based on consideration of the above circumstances. An object of the present invention is therefore to provide an image processing method and an image processing apparatus for automatically recognizing the type of an object included in an image.

An image processing method of the present invention is a method of recognizing the type of an object included in an image, and the image processing method comprises the steps of:

generating object regions by dividing the image into objects and generating a plurality of block regions each having a predetermined number of pixels and being smaller than any one of the object regions, by dividing the image;

recognizing the types of the respective block regions;

totaling up occurrence frequency of each of the types of the respective block regions belonging to each of the object regions; and recognizing the type of each of the object regions based on a result of the totaling.

An object refers to a subject included in an image, such as a person, the sky, a sea, a tree, and a building. An object region refers to an area in the image occupied by the subject.

Recognizing the type of an object refers to identifying the type of an object in an image, such as "mountain", "sea", "flower", and "sky". The type "unknown" is also used in the case where the type is not known.

The image processing method of the present invention may further comprise the steps of:

calculating a type reliability value representing likelihood of each of the object regions being of the recognized type:

setting an image processing condition for each of the object regions by using the type reliability value and the type thereof; and carrying out image processing on each of the object regions by using the image processing condition.

An image processing apparatus of the present invention is an image processing apparatus for recognizing the type of an object included in an image, and the image processing apparatus comprises:

object region extraction means for generating object regions by dividing the image into objects;

block region generation means for generating block regions each having a predetermined number of pixels and having a smaller area than any one of the object regions, by dividing the image into the block regions;

block region recognition means for recognizing the types of the respective block regions; and object recognition means for recognizing the type of each of the objects by totaling up occurrence frequency of each of the types of the block regions in each of the object regions.

The block region recognition means refers to any means that can recognize the type of each of the block regions. For example, the block region recognition means may comprise:

block characteristic quantity extraction means for extracting block characteristic quantities from each of the block regions;

mapping means for mapping the block characteristic quantities into a two-dimensional space; and type output means having a type distribution map that defines the types at respective coordinates in the two-dimensional space, and used for outputting the types indicated by the type distribution map at coordinates of the block characteristic quantities mapped in the two-dimensional space as the types of the block regions.

The two-dimensional space may be a self-organizing map wherein neurons having a learning ability are laid out in the form of a matrix.

The block characteristic quantity extraction means may extract a color component, a lightness component, and a structural component of each of the block regions as the block characteristic quantities.

The object recognition means may have a function of calculating a type reliability value representing likelihood of each of the object regions being of the recognized type.

The image processing apparatus may further comprise:

processing condition setting means for setting an image processing condition for each of the object regions by using the type reliability value and the type thereof found by the object recognition means; and image processing means for carrying out image processing on each of the object regions by using the image processing condition set by the processing condition setting means.

The processing condition setting means can be any means that can set the image processing condition for each of the object regions in the image, and the processing condition setting means may set the image processing condition by calculating a processing efficiency coefficient that depends on the type reliability value and by multiplying an initial image processing condition set for each of the types of the object regions by the processing efficiency coefficient that has been calculated.

The object recognition means may recognize a category representing whether each of the object regions is an artificial object region comprising an artificial image or a natural object region comprising a natural image. In this case, the object recognition means may calculate a category reliability value representing likelihood of each of the object regions belonging to the category, in addition to the type reliability value.

The processing condition setting means may set the image processing condition for each of the object regions by using the type reliability value and the category reliability value, in the case where the image comprises the artificial object region and the natural object region.

The image processing means carries out the image processing such as frequency processing and noise reduction processing according to the image processing condition that has been set. The image processing means may carry out no image processing on the artificial object region.

According to the image processing method and the image processing apparatus of the present invention, the type of each of the objects can be recognized more accurately by using the block regions for recognizing the types of the object regions than in the case of recognizing the object type based on each pixel, since a characteristic caused by image structure can be taken into consideration for judging the type of each of the object regions.

By recognizing the types of the respective block regions and by recognizing the type of each of the object regions after totaling the frequency of each of the types of the block regions therein, the type of each of the object regions can be automatically recognized with accuracy by absorbing a possible mistake in recognition in the types of some of the block regions therein.

If the block region recognition means comprises the block characteristic quantity extraction means, the mapping means, and the type output means having the type distribution map that defines the types at the respective coordinates in the two-dimensional space, the block characteristic quantities are extracted from each of the block regions and mapped into the two-dimensional space. The type output means then outputs the types of the block regions based on the coordinates in the two-dimensional space wherein the characteristics were mapped, with reference to the type distribution map. In this manner, the types of the block regions can be recognized efficiently with accuracy.

If the block characteristic quantity extraction means extracts the color component, the lightness component, and the structural component as the block characteristic quantities, the types of the block regions can be recognized with more accuracy.

By detecting the type reliability value representing how likely it is that each of the object regions is of the recognized type, and by carrying out the image processing on each of the object regions by using the image processing condition that has been set according to the type and the type reliability value of each of the object regions, the image processing in accordance with the types of the object regions can be carried out automatically, which improves image quality.

If the object recognition means calculates not only the type reliability value but also the category reliability value representing how likely it is that each of the object regions belongs to either the category of artificial object region or the category of natural object region, the image processing condition can be changed according to not only the type of each of the object regions but also the category thereof. Therefore, image quality degradation due to automatic image processing on the object regions can be prevented.

Furthermore, if the processing condition setting means can set the image processing condition for each of the object regions by using the type reliability value and the category reliability value thereof in the case where the image includes the artificial object region and the natural object region, an effect of the image processing on the artificial object region can be weakened regardless of possible misclassification of the artificial object region as the natural object region. In this manner, the effect of a change caused by the image processing can be reduced regarding the artificial object region that was generated according to an intention of a creator thereof.

BRIEF DESCRIPTION OF THE DRAWINGS

FIGS. 9A to 9D show examples of type distribution maps used by the image processing apparatus;

FIG. 14 is a block diagram showing another example of the mapping means.

DESCRIPTION OF THE PREFERRED EMBODIMENTS

Figure 1:
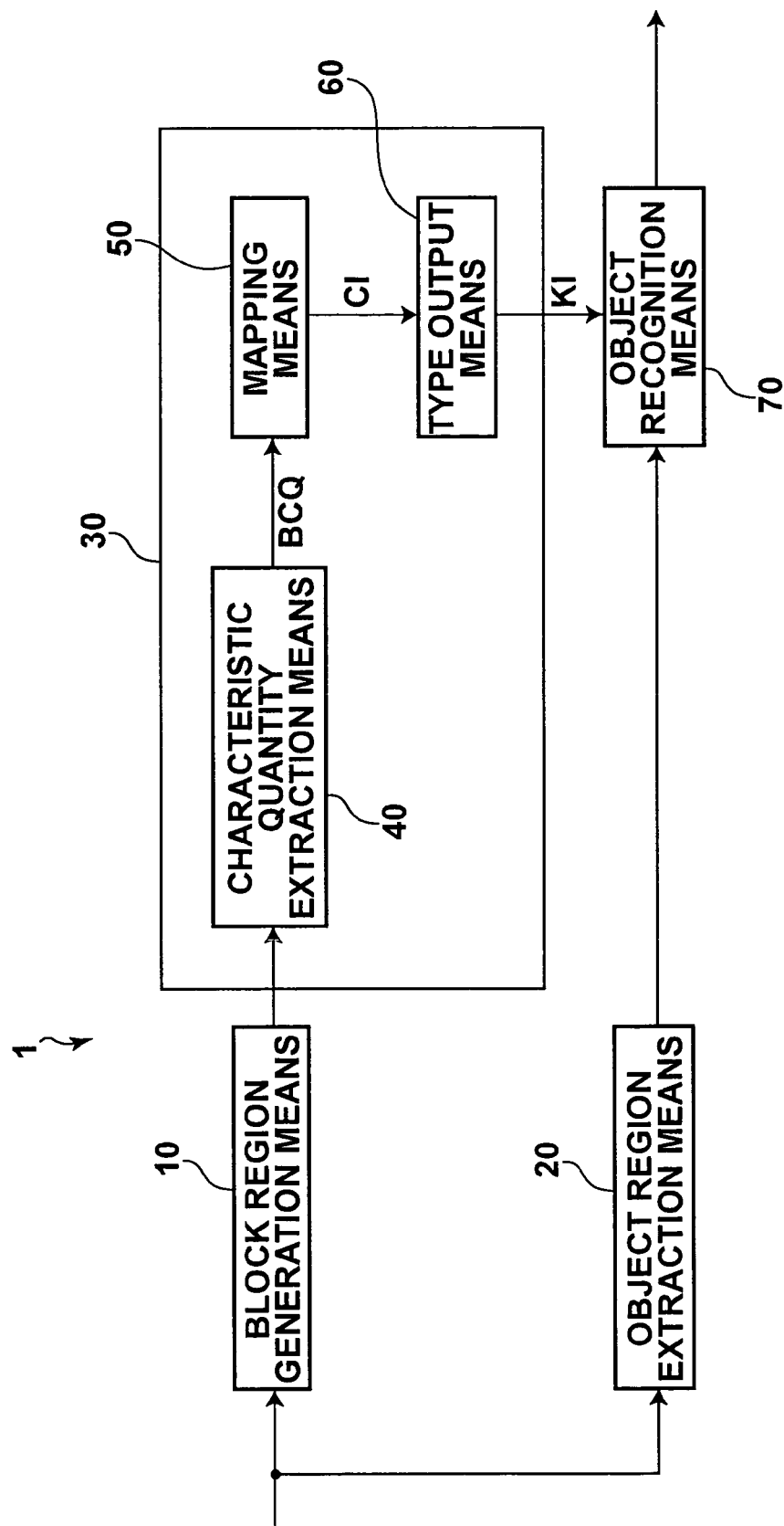
FIG. 1 is a block diagram showing a configuration of a first embodiment of an image processing apparatus of the present invention.

Hereinafter, embodiments of an image processing apparatus of the present invention will be explained with reference to the accompanying drawings. FIG. 1 is a block diagram showing an image processing apparatus of a first embodiment of the present invention. An image processing apparatus 1 shown in FIG. 1 is used for recognizing the types of objects included in an image P. The image processing apparatus 1 comprises block region generation means 10, object region extraction means 20, block region recognition means 30, and object recognition means 70.

Figure 2A:
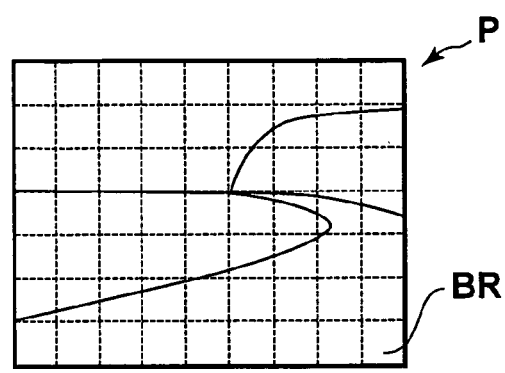
FIGS. 2A to 2C show how the types of objects included in an image are recognized in the image processing apparatus.

The block region generation means 10 has a function of generating block regions BR by dividing the image P into pixels of a predetermined number, as shown in FIG. 2A. The block region generation means 10 sends the block regions BR to the block region recognition means 30. For example, if the predetermined number of pixels is 32×32, the image P is divided into the block regions BR each having 32×32 pixels.

Figure 2B:
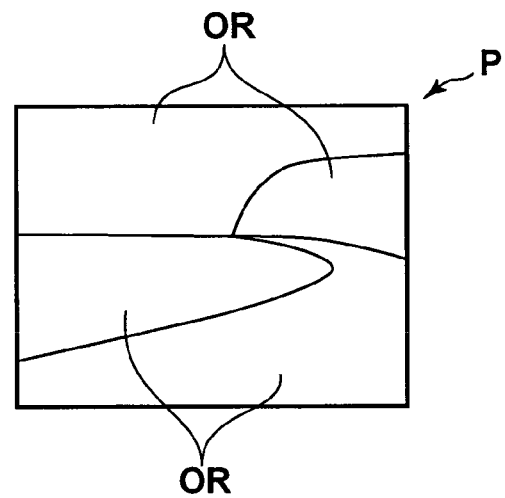

The object region extraction means 20 has a function of generating object regions OR by dividing the image P into objects, as shown in FIG. 2B. The object region extraction means 20 sends the object regions OR to the object recognition means 70.

The block region recognition means 30 has a function of recognizing the types of the block regions BR. More specifically, the block region recognition means 30 determines the types of the block regions in the image P as "mountain", "sea", "flower", and "sky", for example. The block region recognition means 30 sends information on the types of the block regions BR to the object recognition means 70.

Figure 2C:
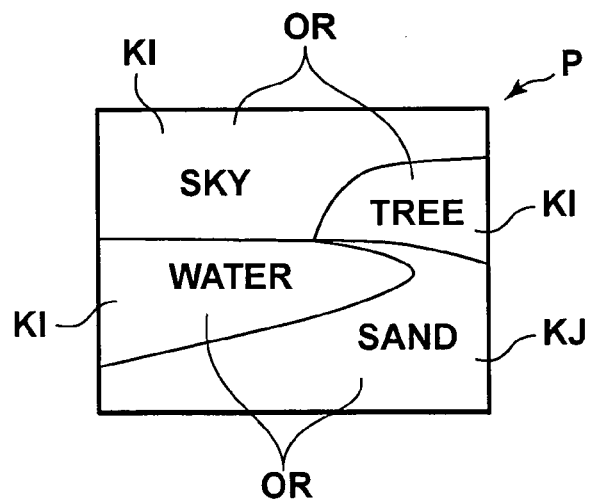
Figure 3:
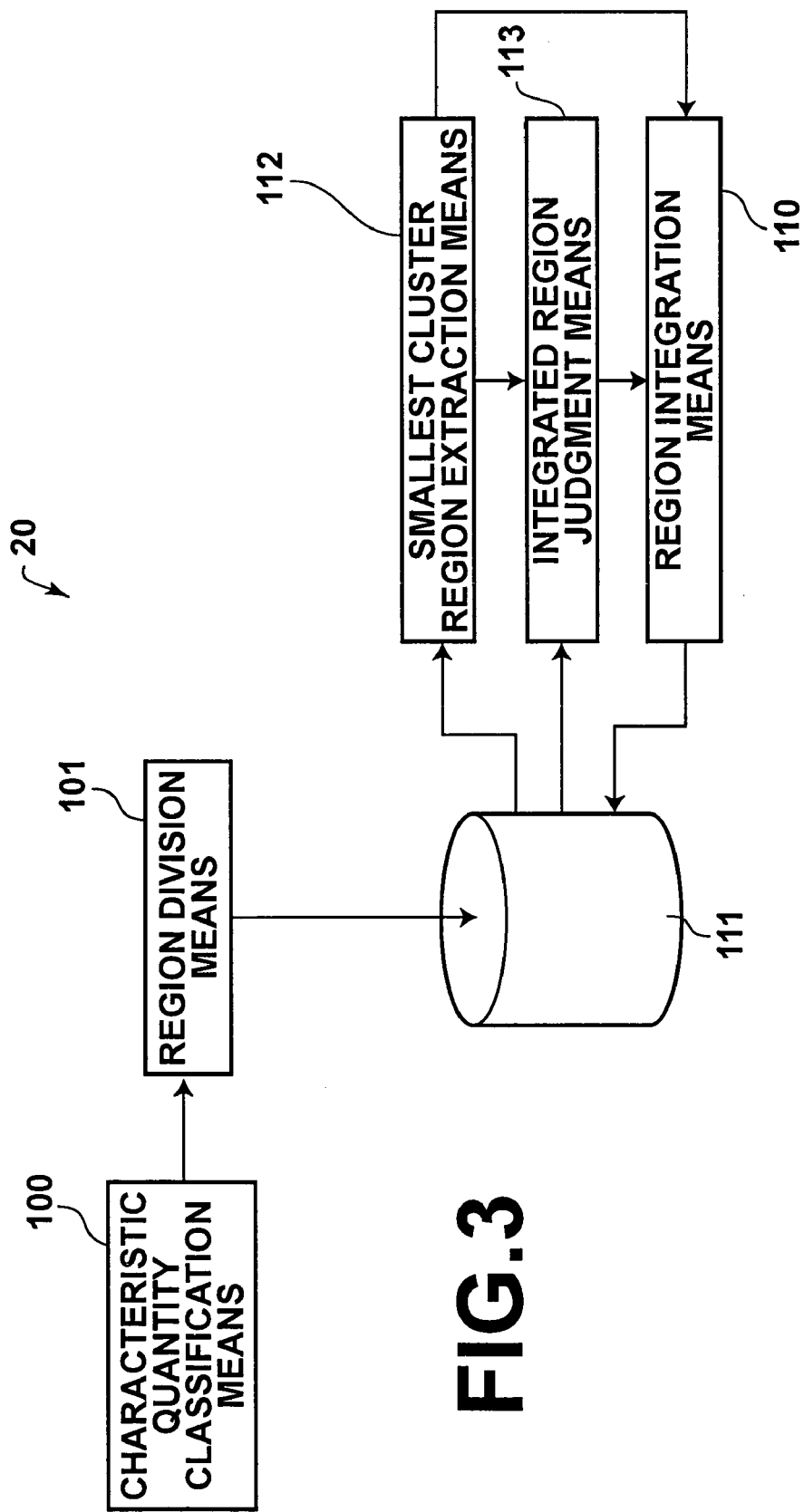
FIG. 3 is a block diagram showing an example of object region extraction means in the image processing apparatus shown in FIG. 1.

The object recognition means 70 has a function of enabling type recognition regarding the object regions OR by attaching type information (hereinafter referred to as type information KI) to each of the object regions OR, with use of the information on the types of the block regions. More specifically, the object recognition means 70 totals up frequency of each of the types of the block regions BR in each of the object regions OR. The object recognition means 70 then recognizes the type of each of the object regions OR as the type of the block regions BR observed most frequently therein. The object recognition means 70 does not use the block regions BR lying over two or more of the object regions for the totaling. Therefore, as shown in FIG. 2C, each of the object regions OR has the information KI on the type thereof, and the object regions can be recognized by the type information KI.

The object recognition means 70 shown in FIG. 1 determines the type of each of the object regions OR by the majority of the types of the block regions BR therein. However, the object recognition means 70 may have a function of outputting "unknown" as the type information KI if a proportion of the majority of the types (that is, the number of the majority type divided by the number of all the block regions BR in each of the object areas OR) is smaller than a threshold value. Alternatively, the object recognition means 70 may output "unknown" as the object type if a difference between the majority type and the second-largest type is small. This function is used because it is more preferable in some cases for a user to have the information "unknown" rather than to have the information of erroneous object type.

The object region extraction means 20 comprises characteristic quantity classification means 100, region division means 101, smallest cluster region extraction means 112, integrated region judgment means 113, and region integration means 110. The characteristic quantity classification means 100 extracts a plurality of characteristic quantities from pixels comprising the image P, and classifies the pixels according to the characteristic quantities that are similar to each other. The region division means 101 generates cluster regions by dividing the image P according to the pixel classification. The smallest cluster region extraction means 112 extracts a smallest cluster region having the smallest number of pixels from the cluster regions. The integrated region judgment means 113 extracts neighboring cluster regions around the smallest cluster region. The region integration means 110 extracts the object regions OR by integrating the cluster regions.

Figure 4A:
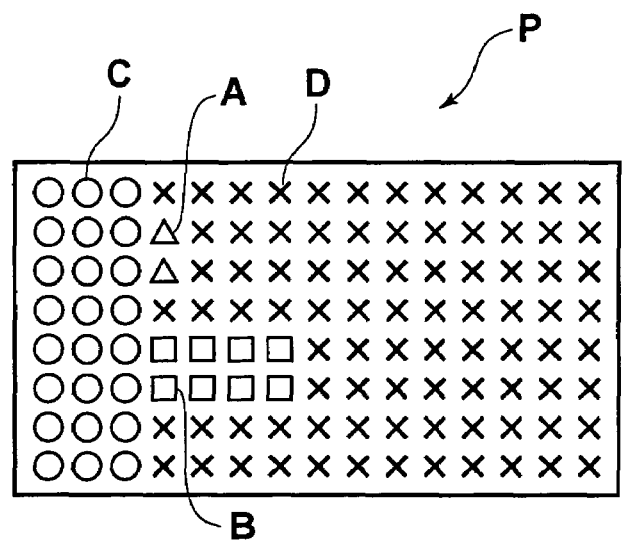
FIGS. 4A and 4B show how the image is divided into object regions by the object region extraction means shown in FIG. 3.
Figure 4B:
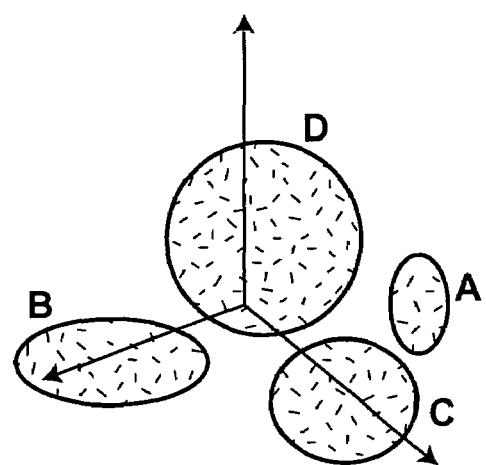

FIGS. 4A and 4B and FIGS. 5A to 5C show how the image P is divided into the object regions OR. The operation of the object region extraction means 20 will be explained first with reference to FIGS. 4A and 4B. Assume that the image P comprises pixels having similar characteristics, as shown in FIG. 4A. The characteristic quantity classification means 100 extracts the characteristic quantities from the pixels, and generates characteristic vectors having the characteristic quantities as elements thereof. The characteristic vectors are classified according to the similar characteristics (this process is called clustering), as shown in FIG. 4B.

Figure 5A:
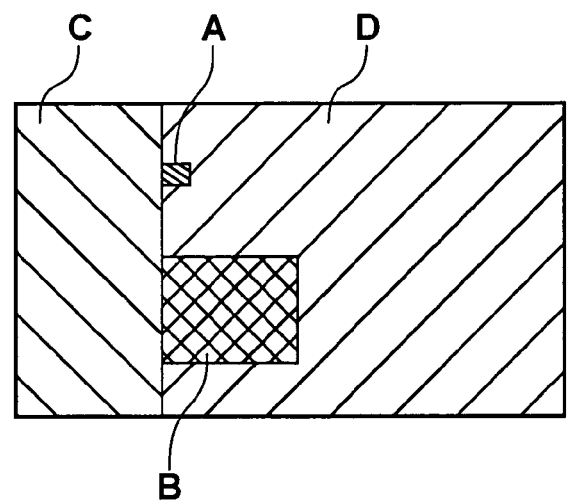
FIGS. 5A to 5C show how an object region is formed through integration of cluster regions by the object region extraction means.

Thereafter, the region division means 101 maps a result of clustering into the actual image P. As shown in FIG. 5A, the cluster regions comprising the similar pixels are then generated, and stored as labeled images in a database 111.

How the regions are integrated will be explained next. The smallest cluster region extraction means 112 extracts the smallest cluster region from the cluster regions stored in the database 111. The integrated region judgment means 113 then extracts the neighboring cluster regions.

In the case where the number of the pixels in the smallest cluster region is equal to or less than a predetermined minute-image threshold value (such as 1/100 of the total number of pixels in the image P), the integrated region judgment means 113 integrates the smallest cluster region with the neighboring cluster region having the largest number of border pixels (the largest border length). More specifically, as shown in FIG. 5A, assume that one of the cluster regions A is the smallest cluster region wherein the number of the pixels is equal to or less than the minute-image threshold value. Since the cluster region A has borders with cluster regions C and D, the cluster regions C and D are the neighboring cluster regions.

Figure 5B:
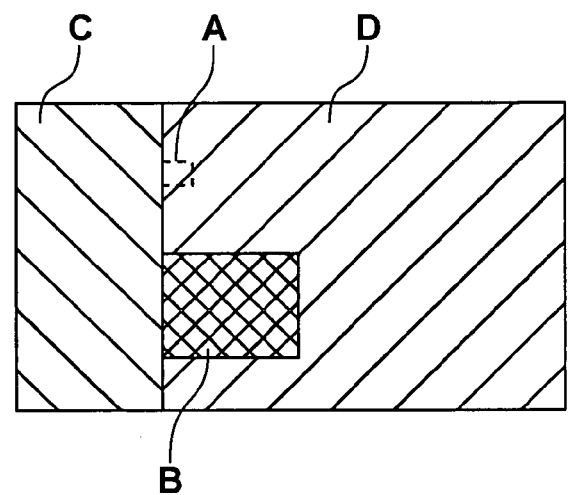

The integrated region judgment means 113 calculates the number of pixels in the borders between the smallest cluster region and the cluster regions C and D. In FIG. 5A, the number of pixels in the border with the cluster region D is larger than the number of pixels in the border with the cluster region C. Therefore, the cluster region A is integrated with the cluster region D, as shown in FIG. 5B.

Figure 5C:
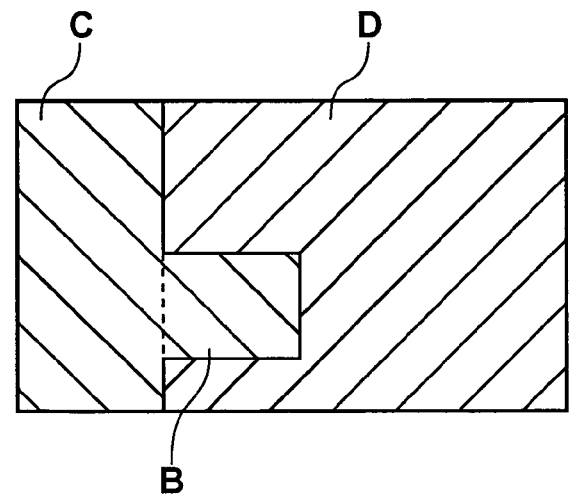

In the case where the number of the pixels in the smallest cluster region is smaller than a predetermined small-image threshold value (such as 1/10 of the total number of the pixels in the image P), the region integration means 110 integrates the smallest cluster region with a neighboring one of the cluster regions that is close to the smallest cluster region in a characteristic space. More specifically, assume that a cluster region B in FIG. 5B is the smallest cluster region wherein the number of pixels is smaller than the predetermined small-image threshold value. The cluster regions C and D are the neighboring cluster regions. If distance is used as a reference, a judgment is made as to which of the cluster regions C or D has a texture similar to that of the cluster region B. The cluster region B is integrated with the cluster region D having the shortest distance in the characteristic space, as shown in FIG. 5C.

The region integration means 110 repeats the above-described procedures until the number of pixels in the smallest cluster region extracted by the smallest cluster extraction means 112 becomes larger than the predetermined small-image threshold value, and the image P is divided into the object regions OR, as shown in FIG. 2C.

The block region recognition means 30 will be explained next with reference to FIG. 1. The block region recognition means 30 has characteristic quantity extraction means 40, mapping means 50, and type output means 60. The characteristic quantity extraction means 40 has a function of extracting block characteristic quantities BCQ from each of the block regions BR. The mapping means 50 has a two-dimensional SOM (Self-Organizing Map), and maps the block characteristic quantities BCQ (multi-dimensional characteristic quantities) into the two-dimensional SOM. The type output means 60 has type distribution maps KDM that define the type of each of positions in the two-dimensional SOM. The type output means 60 outputs the type of each of the block regions BR by using the type distribution maps KDM with reference to coordinate information CI in the two-dimensional SOM mapped by the mapping means 50. Hereinafter, a configuration of the block region recognition means 30 will be explained in detail.

Figure 6:
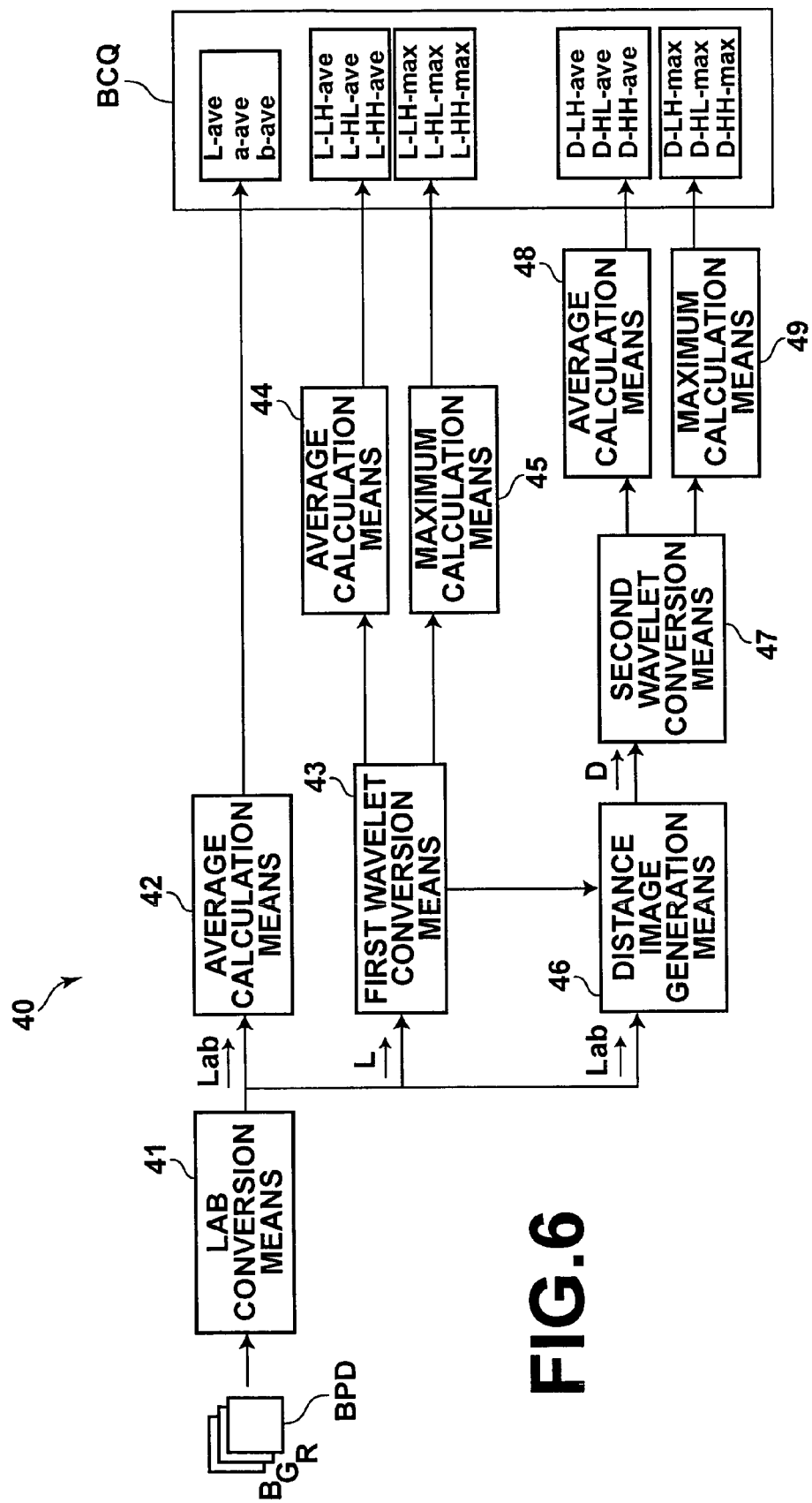
FIG. 6 is a block diagram showing an example of block characteristic quantity extraction means in the image processing apparatus.

FIG. 6 is a block diagram showing an example of the characteristic quantity extraction means 40. The characteristic quantity extraction means 40 outputs 15 of the block characteristic quantities BCQ comprising a color component, a lightness component, and a structural component. The characteristic quantity extraction means 40 comprises Lab conversion means 41, average calculation means 42, first wavelet conversion means 43, distance image generation means 46, and second wavelet conversion means 47.

The Lab conversion means 41 has a function of converting the block regions BR comprising RGB images into Lab images. The average calculation means 42 has a function of calculating averages L-ave, a-ave, and b-ave of L, a, and b components of each of the Lab-converted block regions. The averages L-ave, a-ave, and b-ave comprise the block characteristic quantities BCQ regarding the color component.

The first wavelet conversion means 43 carries out wavelet conversion on the Lab-converted block regions and calculates high frequency components L-LH, L-HL, and L-HH of the lightness component. The first wavelet conversion means 43 is connected to average calculation means 44 and maximum calculation means 45.

The average calculation means 44 calculates averages L-LH-ave, L-HL-ave, and L-HH-ave of the high frequency components L-LH, L-HL, and L-HH of the lightness component calculated by the first wavelet conversion means 43. The averages denoted as L-LH-ave, L-HL-ave, and L-HH-ave are the block characteristic quantities BCQ regarding the lightness component.

The maximum calculation means 45 calculates top-5% values included in frequency distribution of the high frequency components L-LH, L-HL, and L-HH. The calculated values, hereinafter referred to as L-LH-max, L-HL-max, and L-HH-max, are the block characteristic quantities BCQ regarding the lightness component.

By using the averages and the maxima as the block characteristic quantities of the L component, one of the block regions BR wherein the high frequency component having certain intensity is observed uniformly can be distinguished from another one of the block regions BR wherein the high frequency component having the certain intensity is observed only in a limited area. In this manner, the type of each of the block regions BR can be recognized with accuracy.

Figure 7:
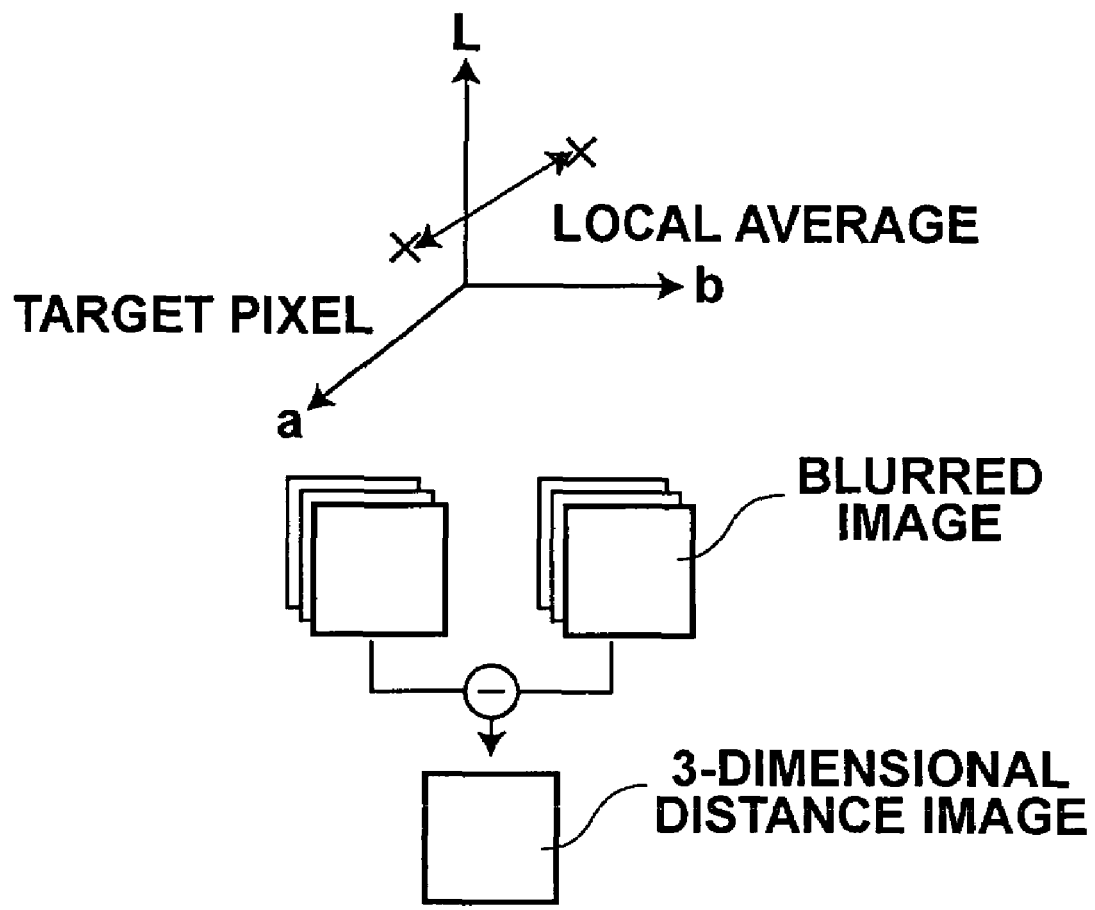
FIG. 7 shows how a distance image is generated by distance image generation means in the image processing apparatus.

The distance image generation means 46 has a function of generating a distance image D from the Lab-converted block regions. The distance image D is different from a general distance image, and is generated by visualizing a Euclidean distance between each of the Lab-converted block regions having 3 variables and a blurred image comprising a low frequency component generated at the time of the wavelet conversion, as shown in FIG. 7. In other words, the three-dimensional distance image in a Lab space is an image generated by visualization of how a signal changes in a uniform color space, and can be explained as an image representing a change perceived by human vision. By dealing with the change in the three-dimensional space, a structural characteristic of the image that cannot be extracted from a lightness image can be extracted, and the type recognition can be carried out more accurately.

More specifically, if the type of each of the block regions BR is recognized based on the characteristic quantities extracted from the pixels, the type cannot be recognized according to an image structure. Therefore, types such as "sky" and "sea" having similar lightness and color but different image structure cannot be distinguished accurately. On the other hand, by carrying out type recognition according to the image structure from which the distance image D is generated for each of the block regions BR, the type can be recognized accurately.

The second wavelet conversion means 47 carries out wavelet conversion on the distance image D, and outputs high frequency components D-LH, D-HL, and D-HH. The second wavelet conversion means 47 is connected to average calculation means 48 and maximum calculation means 49.

The average calculation means 48 calculates averages D-LH-ave, D-HL-ave, and D-HH-ave of the high frequency components D-LH, D-HL, and D-HH calculated by the second wavelet conversion means 47. The averages denoted as D-LH-ave, D-HL-ave, and D-HH-ave are the block characteristic quantities BCQ regarding the structural component.

The maximum calculation means 49 calculates top-5% values included in frequency distribution of the high frequency components D-LH, D-HL, and D-HH. The calculated values, hereinafter referred to as D-LH-max, D-HL-max, and D-HH-max, are the block characteristic quantities BCQ regarding the structural component.

By using the averages and the maxima as the block characteristic quantities of the D (distance) component, one of the block regions BR wherein the high frequency component having certain intensity is observed uniformly can be distinguished from another one of the block regions BR wherein the high frequency component having the certain intensity is observed only in a limited area. In this manner, the type of each of the block regions BR can be recognized with accuracy.

Figure 8:
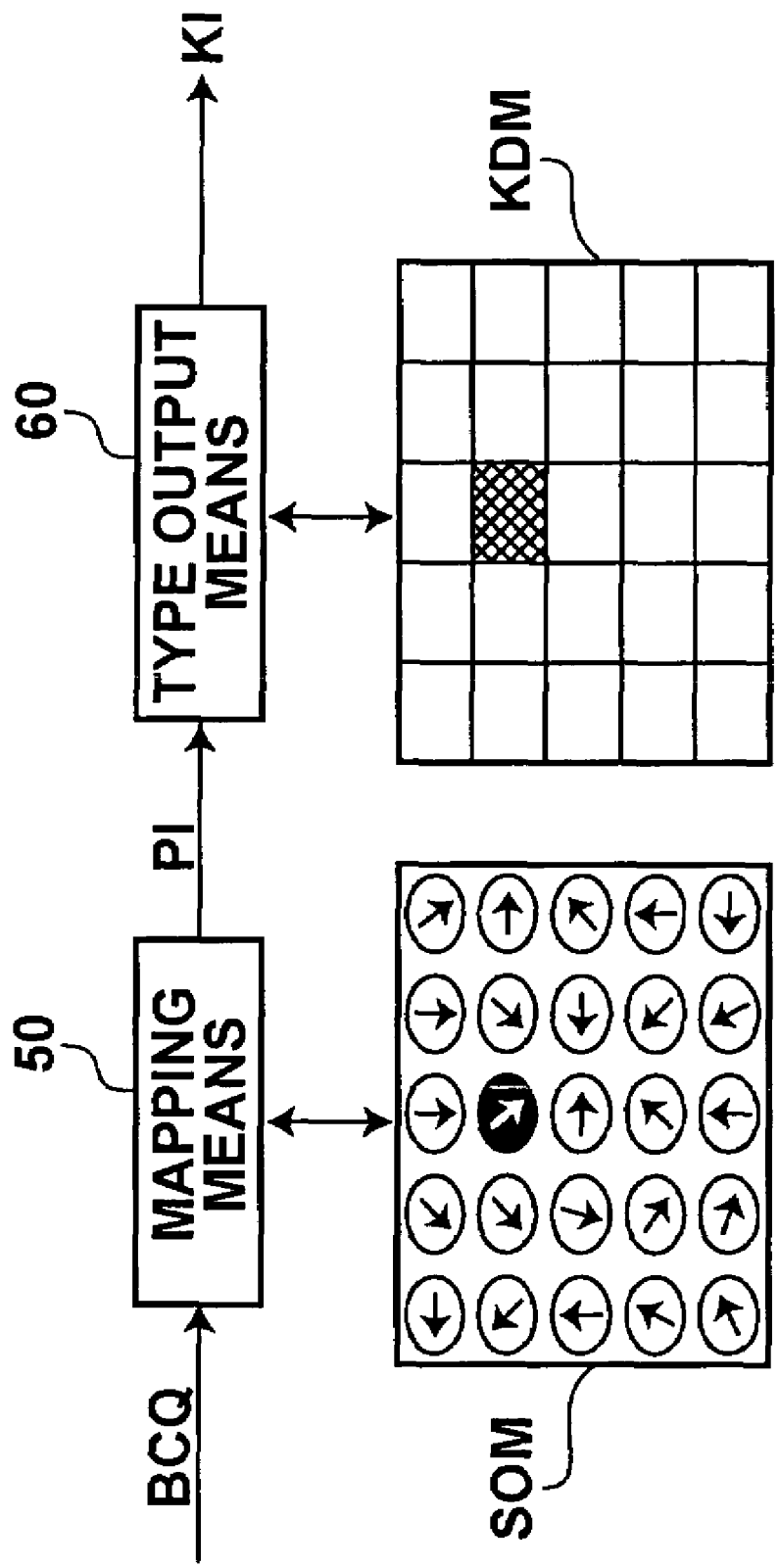
FIG. 8 shows an example of mapping means and type output means in the image processing apparatus.

FIG. 8 shows an example of the mapping means 50 and the type output means 60. The mapping means 50 and the type output means 60 will be explained with reference to FIGS. 1 and 8. In the mapping means 50 and the type output means 60 are used a counter-propagation network using the self-organizing map (see "Application of Self-Organizing Map: Two-Dimensional Visualization of Multi-Dimensional Information" written by Tokudaka, Kishida, and Fujimura and published by Kaibundo in 1999).

The mapping means 50 has the two-dimensional SOM comprising the self-organizing map wherein neurons N are laid out in the form of a matrix, and has a function of mapping the characteristic quantities (multi-dimensional characteristic quantities) into the two-dimensional SOM. Each of the neurons N has vector coordinates in the same dimension as the block characteristic quantities BCQ. In this embodiment, the block characteristic quantities BCQ comprise the 15 block characteristic quantities, and each of the neurons N thus comprises 15-dimensional connection weight vector.

The mapping means 50 selects a neuron Ni (an ignition element) having the closest fit to the 15 block characteristic quantities in each of the block regions BR (that is, the neuron that is closest in terms of the Euclidean distance, for example) from the neurons N in the self-organizing map SOM. In this manner, the multi-dimensional space comprising the 15 block characteristic quantities is mapped into the two-dimensional SOM. The mapping means 50 sends the coordinate information CI of the selected neuron Ni to the type output means 60.

The type output means 60 has the type distribution maps KDM having the same coordinate system as the two-dimensional SOM. The type output means 60 outputs type information KI indicated by positions represented by the coordinate information CI in one of the type distribution maps KDM, according to the coordinate information CI in the two-dimensional SOM mapped by the mapping means 50. As shown in FIG. 9, the type distribution maps KDM show distribution patterns of the coordinate information CI in the two-dimensional space for the respective types of the objects, that is, for the respective types represented by the type information KI. For example, if the type information KI is "sky", distribution of the positions corresponding to the coordinate information CI is concentrated in the right and upper left of the distribution map KDM, as shown by FIG. 9A. Likewise, FIGS. 9B to 9D respectively represent the type distribution maps KDM for the type information KI of "building", "tree", and "sea".

In this example, the case is explained where the type distribution maps KDM are available for the respective types represented by the type information KI. However, the distribution patterns for the types represented by the type information KI may be shown on only one type distribution map KDM.

The self-organizing map SOM and the type distribution maps KDM used in extraction of the type information KI (that is, used in recognition mode) have been trained in advance. In other words, the two-dimensional SOM and the type distribution maps are capable of learning, and each of the neurons N and the type distribution maps KDM are trained by using input data for learning (hereinafter referred to as training data) comprising the block characteristic quantities BCQ extracted from block regions whose type information KI has been known.

More specifically, each of the neurons N in the self-organizing map SOM has a random connection weight vector in an initial state. When the training data having the known type information KI are input to the mapping means 50, the mapping means 50 selects the neuron Ni (the ignition element) which is the closest fit to the input data. At the same time, a portion of the neurons N surrounding the selected neuron Ni, such as 3×3 neurons N, is also selected. The connection weight vectors of the neurons N and Ni are updated to become similar to the training data, and the neurons N in the self-organizing map SOM are trained in this manner.

The process described above is carried out by using several sets of the training data. The training data are repeatedly input to the self-organizing map SOM several times. As the input of the training data is repeated, an area of the neurons N whose connection weight vectors are updated narrows, and the connection weight vector of only the selected neuron Ni is eventually updated.

How the type distribution maps KDM are trained will be explained next. In an initial state, a value at each position in the type distribution maps KDM is set to 0. When the training data are mapped into the two-dimensional SOM as has been described above, the coordinate information CI in the self-organizing map SOM is input. In response to the output of the coordinate information CI, a natural number (such as 1) is added to the values at the position represented by the coordinate information CI and the surrounding positions (such as 3×3) in one of the type distribution maps KDM corresponding to the type of the training data.

The more the training data are input, the values of a specific area in the type distribution map KDM corresponding to the type of the training data increase by the addition. This is because the block characteristic quantities are often mapped in the specific area in the self-organizing map SOM, since the block characteristic quantities of the block regions BR of the same type are similar. Therefore, the values in the specific area increase in the type distribution map KDM.

The values at all the positions in the type distribution map KDM are divided by a product of the number of the training data (training vectors) and the number of training repetition, and the type distribution map KDM is generated wherein a probability from 0.0 to 1.0 is represented at each of the positions therein. The larger the probability is, the more likely the object belongs to the type. In the type distribution maps KDM in FIG. 9, a white area represents an area having a reliability value (that is, the probability) of 0.8 to 1.0, while a gray area represents the reliability value of 0.2 to 0.8. A black area represents the reliability value of 0.0 to 0.2. In this manner, the type distribution maps KDM are generated for the respective types represented by the type information KI.

At the time of recognizing the type of each of the actual block regions BR (that is, in a recognition mode), the type output means 60 extracts the reliability value at the position represented by the coordinate information CI from the plurality of type distribution maps KDM. More specifically, when the mapping means 50 sends the coordinate information CI, the type output means 60 extracts the reliability value at the position corresponding to the coordinate information CI, from each of the type distribution maps for "sky", "building", "tree", and "sea", for example. The type output means 60 then generates a classification vector having the probabilities of the type distribution maps KDM as components thereof. In this case, the classification vector having the components of the reliabilities of "sky", "building", "tree", and "sea" is generated. The type output means 60 then judges the type information KI having the largest probability as the type information KI of the corresponding block region BR, and sends the type information KI to the object recognition means 70.

In the type recognition means 60, in the case where the vector component having the largest probability value in the classification vector is smaller than a predetermined threshold value, the reliability value of recognition of the type for the corresponding block region BR may be judged to be low. In this case, the type information KI representing "unknown" is sent to the object recognition means 70. Alternatively, the type information KI representing "unknown" may be sent to the object recognition means 70 in the case where a difference between the largest vector component and the second-largest vector component is small and thus the reliability value of recognition of the type is judged to be low. In this manner, for the block region BR whose reliability value is low regarding the type recognition thereof, an effect of the block region BR can be reduced in recognizing the kind of the object region OR including the block region BR. Consequently, accuracy of the object recognition can be improved.

When the mapping mean 50 maps the block characteristic quantities BCQ into the self-organizing map SOM, if the distance (Euclidean distance, for example) between the most similar neuron Ni (the ignition element) and the mapped point representing the block characteristic quantities BCQ is larger than a predetermined threshold value, the mapping means 50 may send to the type output means 60 information representing the fact that no matching processing is carried out. In this case, the type output means sends the type information KI representing "unknown" to the object recognition means 70. In this manner, for the block region BR whose reliability value is low regarding the type information KI thereof, an effect of the block region BR can also be reduced in recognizing the type of the object region OR. Consequently, accuracy of the object recognition can be improved.

Figure 10:
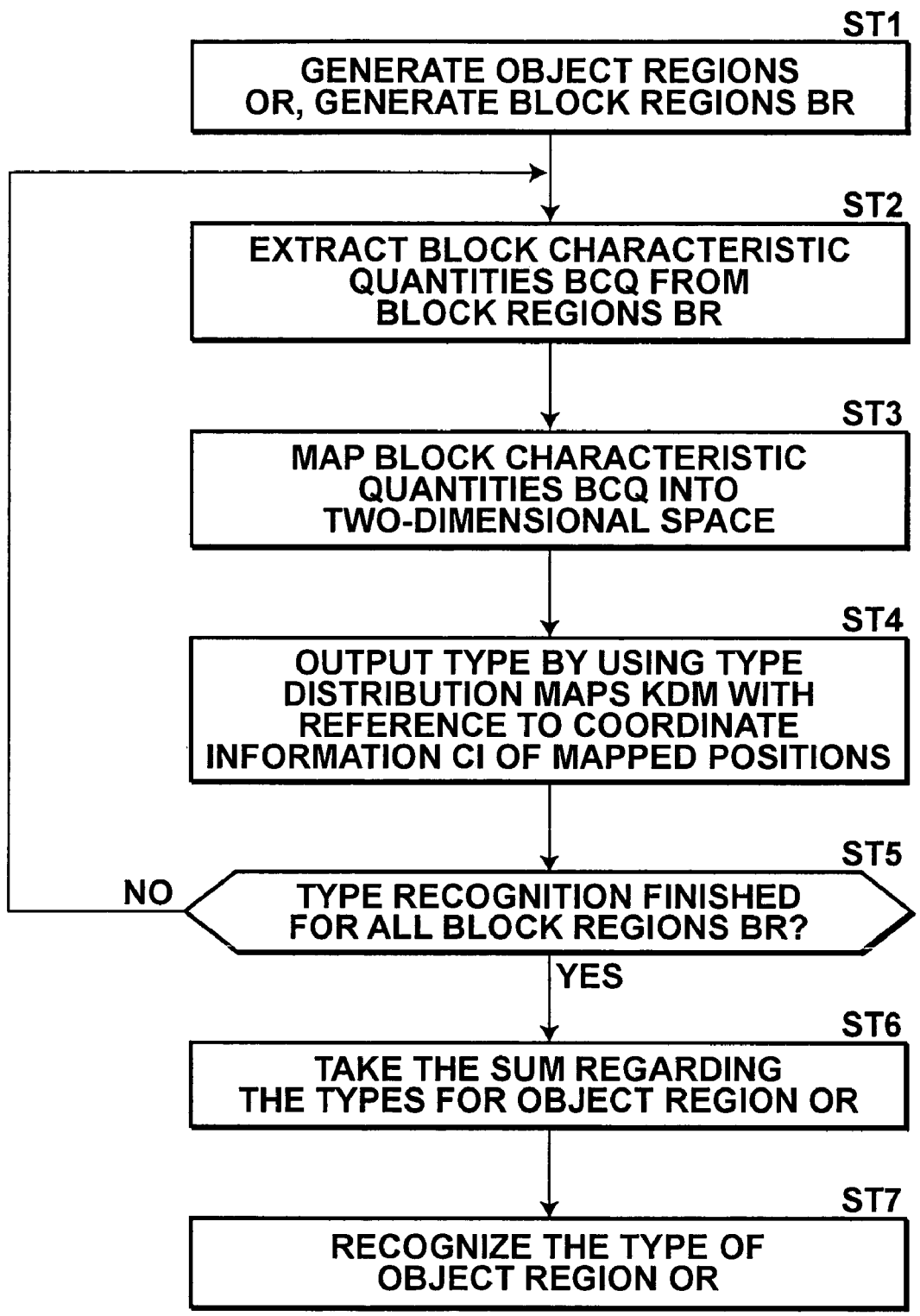
FIG. 10 is a flow chart showing preferable procedures of an image processing method of the present invention.

FIG. 10 is a flow chart showing procedures of an image processing method of the present invention, and how the image processing is carried out will be explained with reference to FIGS. 1 to 10. The object region extraction means 20 generates the object regions OR by dividing the image P into the object regions OR. The block region generation means 10 also generates the block regions BR each having the predetermined number of pixels (such as 32×32 pixels) and a smaller area than any one of the object regions OR, by dividing the image P (Step ST1).

The block characteristic quantity extraction means 40 extracts the 15 block characteristic quantities BCQ from each of the block regions BR (Step ST2). Thereafter, the mapping means 50 maps the extracted characteristic quantities BCQ into the self-organizing map SOM, and the coordinate information CI in the self-organizing map SOM is sent to the type output means 60 (Step ST3). The type output means 60 extracts the type information KI regarding the coordinate information CI by using the type distribution maps KDM, and sends the type information KI to the object recognition means 70 (Step ST4). The above-described process is repeated for all the block regions BR (Step S5).

The object recognition means 70 totals up the types represented by the type information KI regarding the block regions BR (Step ST6), and outputs the type observed most frequently as the type information KI of the corresponding object region OR (Step ST7).

In the above embodiment, the type information KI is extracted for each of the block regions BR, and occurrence frequency of the types represented by the type information KI is counted for each of the block regions BR for recognizing the type of the corresponding object region OR. In this manner, the type of the object can be automatically recognized. In some cases, the block region recognition means 30 may extract the type information KI that is different from the true type information of the corresponding object region OR regarding some of the block regions BR. For example, if the object is actually "sea", some of the block regions BR therein may be recognized as "sky". In this case, since the most frequently observed type is used as the type information of the corresponding object region OR, the type information representing the different type caused by misclassification can be prevented from being attached as the type information KI of the corresponding object even if some of the block regions BR therein have been attached with the type information KI that is different from the true type information. Therefore, the type information KI can be recognized automatically and accurately regarding each of the object areas OR.

As has been described above, the color component, the lightness component, and the structural component are extracted as the characteristic quantities BCQ of each of the block regions BR, and the block characteristic quantities BCQ are input to the counter propagation network. In this manner, the type information KI of the block regions BR can be recognized. In the case where the characteristic quantities are extracted from the pixels for inferring the type information KI, the type information KI cannot be recognized accurately, because the characteristic quantities extracted from the pixels of the image do not include distance information (image information). Therefore, only the lightness information or the color information can be extracted. Since the color of "sky" and "sea" may be the same, an object of "sea" may be recognized as an object of "sky".

On the other hand, if the block characteristic quantities BCQ are extracted for each of the block regions BR and the type information KI is output based on the block characteristic quantities BCQ, objects having the similar color information or lightness information such as "sky" and "sea" can be distinguished from each other, and the type information KI is also recognized with accuracy.

Figure 11:
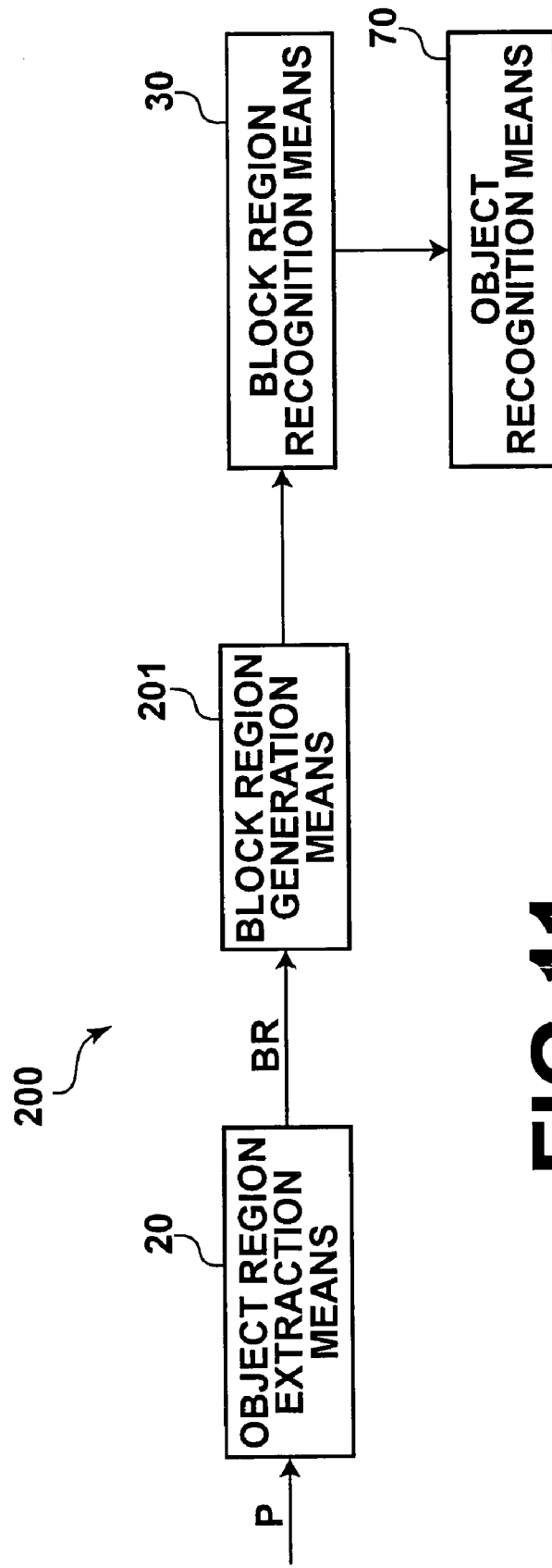
FIG. 11 is a block diagram showing a configuration of a second embodiment of an image processing apparatus of the present invention.

FIG. 11 is a block diagram showing a second embodiment of an image processing apparatus of the present invention, and an image processing apparatus 200 will be explained with reference to FIG. 11. In the image processing apparatus 200, the same elements as in the first embodiment have the same reference numbers and detailed explanations thereof will be omitted.

The image processing apparatus 200 in FIG. 11 extracts the object regions OR and then divides the object region OR into the block regions BR.

More specifically, the image processing apparatus 200 in FIG. 11 comprises block region generation means 201, the object region extraction means 20, the block region recognition means 30, and the object recognition means 70. The object region extraction means 20 divides an image into the object regions OR, and each of the object regions OR is divided by the block region generation means 201. The block region recognition means 30 recognizes the type of each of the block regions BR in each of the object regions OR, and the object recognition means 70 takes the sum thereof. In this manner, the type of each of the objects can be recognized, and the image processing apparatus 200 has the same effect as the image processing apparatus 1 shown in FIG. 1.

Figure 12:
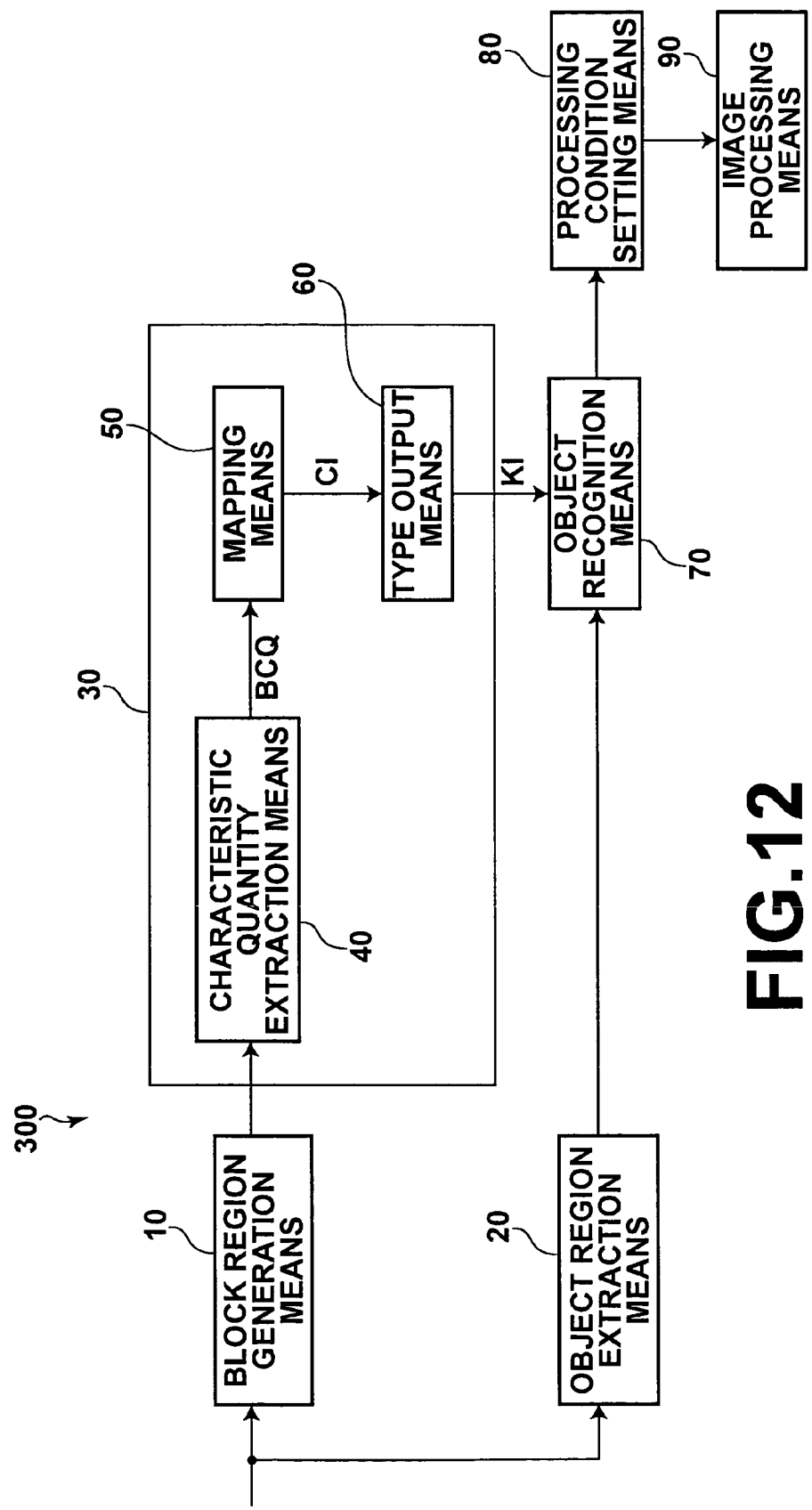
FIG. 12 is a block diagram showing a configuration of a third embodiment of an image processing apparatus of the present invention.

An image processing apparatus of a third embodiment of the present invention will be explained with reference to FIG. 12. FIG. 12 is a block diagram showing the third embodiment. In an image processing apparatus 300 in FIG. 12, the same elements as in the first embodiment have the same reference numbers, and detailed explanations thereof will be omitted.

The image processing apparatus 300 in FIG. 12 changes an image processing condition in accordance with the type of each of the object regions OR. More specifically, the image processing apparatus 300 further comprises processing condition setting means 80 for setting an image processing condition OP for each of the object regions OR by using the type of the object and a reliability value thereof that are found by the object recognition means 70, and image processing means 90 for carrying out image processing on each of the object regions OR by using the image processing condition that has been set by the processing condition setting means. The object recognition means 70 calculates the reliability value representing likelihood of each of the object regions OR being actually of the recognized type.

The object recognition means 70 has the function of calculating the reliability value (hereinafter referred to as the type reliability value KR) as a share of the occurrence frequency of the determined type. More specifically, the object recognition means 70 calculates the type reliability value KR ($0 \leq KR \leq 1$) by dividing the number of the block regions BR belonging to the same type as the corresponding object region OR by the total number of the block regions BR comprising the object region OR. The object recognition means 70 then sends the type reliability value KR and the type information KI to the processing condition setting means 80.

The operation of the processing condition setting means 80 will be explained next with reference to FIG. 12. The processing condition setting means 80 sets the image processing condition OP for each of the object regions OR by using the type information KI and the type reliability value KR sent from the object recognition means 70. More specifically, the processing condition setting means 80 has an initial image processing condition OPref set for each of the types of the object regions OR, and the processing condition setting means 80 extracts one of the initial image processing conditions OPref in accordance with the type represented by the type information KI.

The processing condition setting means 80 multiplies the initial image processing condition OPref by a processing efficiency coefficient reflecting the type reliability value KR, and sets the image processing condition OP for the corresponding object region OR. For example, if the type of one of the object regions is "sky" or "skin", in order to reduce noise, the processing condition setting means 80 calculates a high frequency gain Gh=OPref×(1−KR×0.5), and uses the high frequency gain Gh as the image processing condition OP. If one of the object regions OR belongs to the type "building", in order to enhance sharpness, the processing condition setting means 80 calculates the high frequency gain Gh=OPref×(1+KR×0.5), and uses the high frequency gain Gh as the image processing condition OP. In the case where the type of one of the object regions OR is "unknown", the processing condition setting means 80 sets the initial image processing condition OPref as the image processing condition OP.

As has been described above, in the case where the type reliability value KR is low, the image processing condition that is closer to the initial image processing condition OPref is used as the image processing condition OP. In other words, if the type reliability value is low, the effect of noise reduction can be prevented from being too extreme.

The image processing means 90 carries out the image processing on each of the object regions OR by using the image processing condition OP set by the processing condition setting means 80. More specifically, in the case where the high frequency gain Gh has been set as the image processing condition OP, the image processing means 90 carries out the image processing so as to satisfy:

the image P after the image processing=I_L+Gh×I_H wherein L and H refer to a low frequency component and a high frequency component, respectively.

Figure 13:
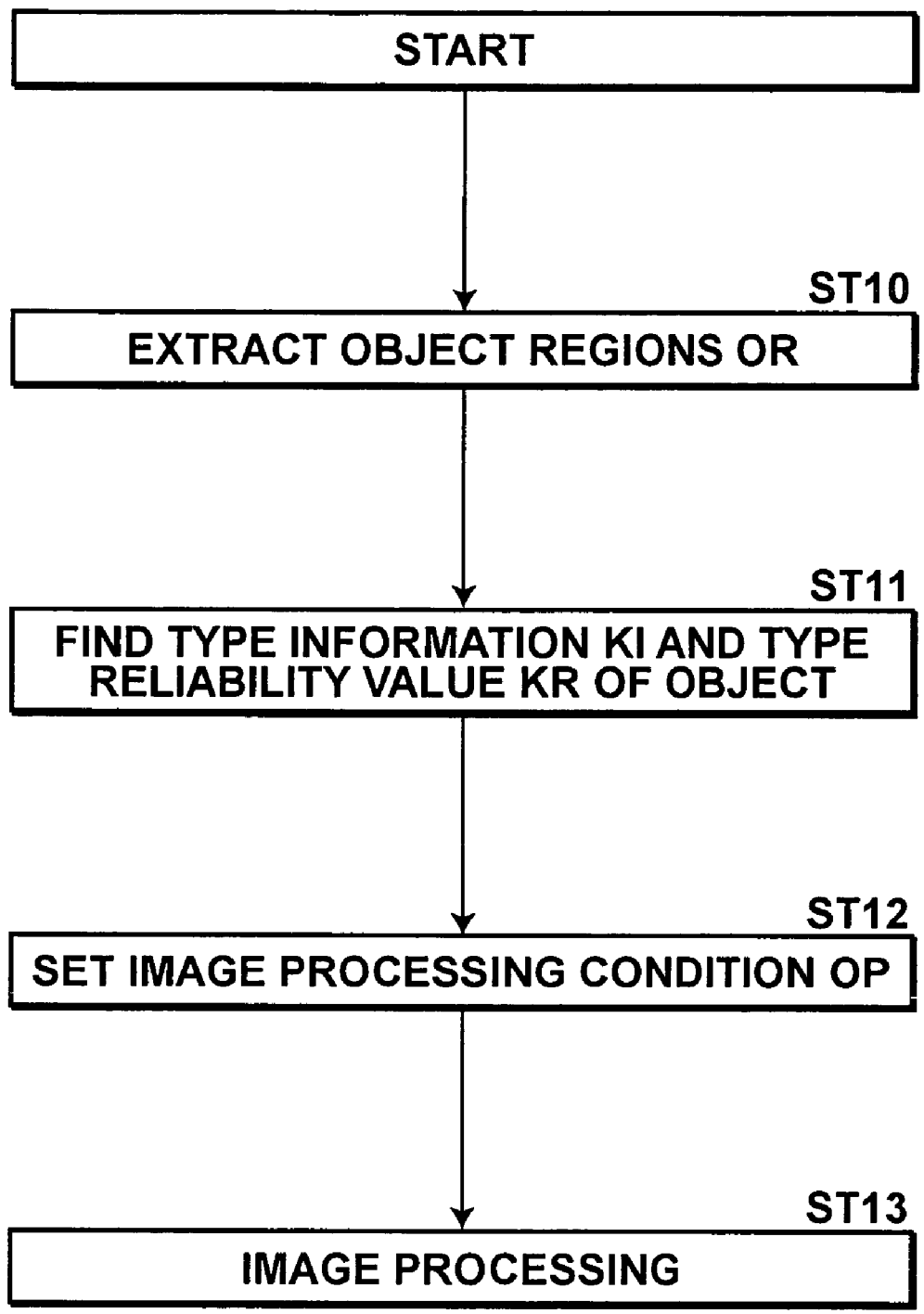
FIG. 13 is a flow chart showing the operation of the image processing apparatus shown in FIG. 12.

FIG. 13 is a flow chart showing procedures of an image processing method of the present invention described above. The object region extraction means 20 divides the image P into the object regions OR (Step ST10), and the object recognition means 70 attaches the type information KI to each of the object regions OR according to the method described as Step ST1 to Step ST7 (Step ST1). The object recognition means 70 also calculates the type reliability value KR, and inputs the type information KI and the type reliability value KR to the processing condition setting means 80.

The processing condition setting means 80 generates the image processing condition OP for each of the object regions OR (Step ST12). Thereafter, the image processing means 90 carries out the image processing by using the image processing condition OP reflecting the type of each of the object regions OR (Step ST13).

As has been described above, according to the third embodiment, the object regions OR are extracted from the image P, and the type information KI as well as the type reliability value KR are found for each of the object regions OR. By using the type information KI and the type reliability value KR, the image processing condition OP is set, and the image processing is carried out according to the image processing condition OP on each of the object regions OR. In this manner, the image processing can be carried out in accordance with the type of each of the object regions OR, which leads to image quality improvement. In the case where the image processing condition OP is set according to physical characteristics such as color and texture of the image P, object regions OR of different kinds but having similar physical characteristics, such as "sand" and "skin" are processed according to the same image processing condition. Therefore, the image processing may generate a result that is not preferable for some of the object regions.

On the other hand, according to the method of the present invention, by setting the image processing condition OP based on a characteristic of an image of the type of each of the object regions OR, image quality improvement can be achieved. Furthermore, by setting the image processing condition OP by using both the type information KI and the type reliability value KR, an effect of the image processing can be enhanced or weakened according to the type reliability value KR. Therefore, even in the case where the type is erroneously detected, image quality degradation due to the image processing can be minimal.

In the explanation of the processing condition setting means 80 in FIG. 12, the high frequency gain Gh is used as the image processing condition OP. However, the type reliability value KR may be set according to a histogram for gradation processing or a parameter such as density.

The object recognition means 70 in FIG. 12 detects both the type reliability value KR and the type information KI. However, in addition to the type information KI, the object recognition means 70 may recognize a category of each of the object regions OR for distinguishing an object region ORa of an "artificial image" from an object region ORn of a "natural image". The object recognition means 70 then sends information on the category to the processing condition setting means 80. The object recognition means 70 has classified the types represented by the type information KI into a natural image category or an artificial image category in advance. More specifically, the object recognition means 70 groups the type information KI representing "sky", "tree", and "building" into the natural image category, and the type information KI representing "characters" and "frame" into the artificial image category.

The object recognition means 70 also has a function of calculating a category reliability value CR representing a reliability value of the category being true. The category reliability value CR is calculated according to the same procedures described above for the type reliability value KR. The processing condition setting means 80 sets the image processing condition OP by using the type reliability value KR and the category reliability value CR of each of the object regions OR.

More specifically, in the case where one of the object regions OR has been judged to be of the type "sky" or "skin", in order to reduce noise, the processing condition setting means 80 calculates the high frequency gain Gh according to an equation Gh=OPref×(1−KR×CR×0.5), and uses the high frequency gain Gh as the image processing condition OP. In other words, the effect of image processing on the corresponding object region OR is wakened by the category reliability value CR.

For example, in the case where the image processing has been carried out on the artificial object region ORa by mistaking the object region as the natural object region ORn, the object may not reflect an intension of a person who generated the artificial image. In order to solve this problem, the image processing condition OP is set to become dependent on the category reliability value CR. Consequently, even in the case where the artificial object region ORa is mistaken as the natural object region ORn, the image processing on the artificial object region ORa can be weakened. In this manner, a side effect of the image processing can be reduced.

The image processing means 90 in FIG. 12 may carry out no image processing on the artificial object region ORa. In this manner, the image processing can be prevented from being carried out on the artificial object region ORa.

Although the preferred embodiments of the present invention have been explained above, the image processing apparatus of the present invention is not limited to the embodiments described above. For example, the mapping means 50 shown in FIG. 8 has only one self-organizing map SOM. However, the mapping means 50 may have two self-organizing maps, as shown in FIG. 14. More specifically, mapping means 150 in FIG. 14 has a first self-organizing map SOM1 and a second self-organizing map SOM2. The mapping means 150 also comprises first mapping means 151 and second mapping means 152. The first mapping means maps the block characteristic quantities BCQ into the first self-organizing map SOM1, and outputs first coordinate information CI to the second mapping means 152. The second mapping means 152 receives the first coordinate information CI1 in the first self-organizing map SOM1 from the first mapping means 151 for each of the block regions BR, and maps the first coordinate information CI1 into the second self-organizing map SOM2.

The first mapping means 151 and the first self-organizing map SOM1 have the same structure as the mapping means 50 and the self-organizing map SOM. The second mapping means 152 maps the first coordinate information CI1 output from the first mapping means 151 into the second self-organizing map SOM2 for the block regions BR having a specific special relation, such as a 3×3 neighboring block regions, for example. In this manner, upon recognition of the type to be represented by the type information KI regarding the block regions BR, the type can be recognized by using a wider-area characteristic caused by the image structure of the block regions BR. Therefore, accuracy of recognition can be improved. Furthermore, the type can also be recognized by using a wider structure if SOMs having more steps are used instead of the two-step SOMs described above.

The block region recognition means 30 in FIG. 1 sends the type information KI such as "sky" and "sea" to the object recognition means 70. However, the classification vector itself may be sent as the type information KI to the object recognition means 70. In this case, the object recognition means 70 simply adds the classification vector of each of the block regions BR in each of the object regions OR, and recognizes the largest vector component in the resulting classification vector as the type information KI of the corresponding object region OR. Alternatively, in the case where the largest vector component is smaller than a predetermined threshold value, the object recognition means 70 may determine the kind as "unknown" regarding the corresponding object region OR.

At the time of generation of the object regions OR and the block regions BR, resolution of the image P is used as it is, in the above example. However, the resolution may be lowered before input of the image P to the object region extraction means 20 and the block region generation means 10. By lowering the resolution, an amount of data to be processed can be reduced, which leads to higher processing speed and efficient processing.

Furthermore, the resolution at the time of generating the object regions OR and the resolution at the time of generating the block regions BR are not necessarily the same. For example, the resolution of the block regions BR may be higher than that of the object regions OR. This is because the object regions OR are generated for roughly dividing the image P into the objects while the block regions BR are generated for extracting the type information KI thereof, as has been described above. Therefore, the purpose of classifying the image can be achieved even if a comparatively low-resolution image is used for the object regions.

In FIG. 1, the block regions BR generated by the block region generation means 10 are sent to the block region recognition means 30. However, the block regions may be sent to the block region recognition means 30 after being subjected to smoothing processing such as morphology processing or closing operation thereon. In this manner, an isolated noise component included in each of the block regions BR can be eliminated, and accuracy of type recognition can be improved.

The image processing apparatus 1 in FIG. 1 may be configured by hardware or as a combination of an object recognition program and a computer. The object recognition program is a program for causing the computer to recognize the type of an object included in an image. The program causes the computer to have object region extraction means for generating object regions by dividing the image, block region generation means generating block regions by diving the image into the block regions each having a predetermined number of pixels and smaller than any one of the object regions, block region recognition means for recognizing the types of the block regions, and object recognition means for totaling up occurrence frequency of the types of the block regions for each of the object regions and for recognizing the type of the object by using a result of the totaling.

What is claimed is:

1. An image processing method comprising:
   generating object regions by dividing an image into objects, and generating a plurality of block regions each having a predetermined number of pixels and having a smaller area than any one of the object regions by dividing each of the generated object regions;
   recognizing the types of the respective block regions;
   totaling up occurrence frequency of each of the types of the respective block regions in each of the object regions;
   recognizing the type of each of the object regions based on a result of the totaling;
   calculating a type reliability value representing likelihood of each of the object regions being of the recognized type,
   setting an image processing condition for each of the object regions by using the type reliability value and the type thereof; and carrying out image processing, using an image processing apparatus, on each of the object regions by using the image processing condition.

2. The image processing method according to claim 1, wherein the recognizing the type of each of the object regions is determined as the type of the block regions occurring most frequently therein.

3. The image processing method according to claim 1, further comprising:
calculating a type reliability value representing likelihood of each of the object regions being of the recognized type.

4. The image processing method according to claim 1, wherein prior to the generating the object regions by dividing the image into the objects, sizes of the objects are unknown.

5. The image processing method according to claim 1, wherein the predetermined number of pixels is a plurality of pixels, and the recognizing the types of the respective block regions comprises:
extracting at least a color component representing a color among at least red, blue, or green of each of the plurality of the block regions, wherein the color component is extracted based on the plurality of the pixels within each of the plurality of the block regions; and
recognizing the types of the respective block regions based on at least the extracted color component.

6. The image processing method according to claim 1, wherein the object regions are natural images.

7. The image processing method according to claim 6, wherein the natural images comprise an image of a sky, a tree, or a building.

8. An image processing apparatus comprising:
object region extraction means for generating object regions by dividing an image into objects;
block region generation means for generating block regions each having a predetermined number of pixels and having a smaller area than any one of the object regions, by dividing each of the generated object regions;
block region recognition means for recognizing the types of the respective block regions;
object recognition means for recognizing the type of each of the objects by totaling up occurrence frequency of each of the types of the block regions in each of the object regions;
wherein the object recognition means has a function of calculating a type reliability value representing likelihood of each of the object regions being of the recognized type, and wherein the image processing apparatus further comprises:
processing condition setting means for setting an image processing condition for each of the object regions by using the type reliability value and the type thereof found by the object recognition means; and
image processing means for carrying out image processing on each of the object regions by using the image processing condition set by the processing condition setting means.

9. The image processing apparatus according to claim 8, wherein the block region recognition means comprises:
block characteristic quantity extraction means for extracting block characteristic quantities from each of the block regions;
mapping means for mapping the block characteristic quantities into a two-dimensional space; and
type output means having a type distribution map that defines the types at respective coordinates in the two-dimensional space, the type output means for outputting the types indicated by the type distribution map at coordinates of the block characteristic quantities mapped in the two-dimensional space as the types of the block regions.

10. The image processing apparatus according to claim 9, wherein the two-dimensional space is a self-organizing map wherein neurons having a learning ability are laid out in the form of a matrix.

11. The image processing apparatus according to claim 9, wherein the block characteristic quantity extraction means extracts a color component, a lightness component, and a structural component of each of the block regions as the block characteristic quantities.

12. The image processing apparatus according to claim 8, wherein the processing condition setting means sets the image processing condition by calculating a processing efficiency coefficient that depends on the type reliability value and by multiplying an initial image processing condition set for each of the types of the object regions by the processing efficiency coefficient that has been calculated.

13. The image processing apparatus according to claim 8, wherein the object recognition means recognizes a category representing whether each of the object regions is an artificial object region comprising an artificial image or a natural object region comprising a natural image, and calculates a category reliability value representing likelihood of each of the object regions belonging to the category, in addition to the type reliability value.

14. The image processing apparatus according to claim 13, wherein the processing condition setting means sets the image processing condition for each of the object regions by using the type reliability value and the category reliability value, in the case where the image comprises the artificial object region and the natural object region.

15. The image processing apparatus according to claim 8, wherein the object recognition means recognizes the type of each of the object regions as the type of the block regions occurring most frequently therein.

16. The image processing apparatus according to claim 8, wherein the object recognition means has a function of calculating a type reliability value representing likelihood of each of the object regions being of the recognized type.

17. The image processing apparatus according to claim 8, wherein prior to the object region extraction means generating the object regions by dividing the image into the objects, sizes of the objects are unknown.

18. The image processing apparatus according to claim 8, wherein the predetermined number of pixels is a plurality of pixels, and the block region recognition means recognizes the types of the respective block regions by extracting at least a color component representing a color among at least red, blue, or green of each of the plurality of the block regions, wherein the color component is extracted based on the plurality of the pixels within each of the plurality of the block regions, and recognizes the types of the respective block regions based on at least the extracted color component.

19. The image processing apparatus according to claim 8, wherein the object regions are natural images.

20. The image processing apparatus according to claim 19, wherein the natural images comprise an image of a sky, a tree, or a building.

* * * * *